L. T. SHERWOOD.
METHOD OF RECOVERING FROM NITER CAKE PRODUCTS USEFUL IN THE ARTS.
APPLICATION FILED FEB. 8, 1917.

1,255,474. Patented Feb. 5, 1918.

WITNESS:
Rob. R. Kitchel

INVENTOR
Laurence T. Sherwood
BY
Augustus B. Stoughton
ATTORNEY

UNITED STATES PATENT OFFICE.

LAURENCE T. SHERWOOD, OF CONNELLSVILLE, PENNSYLVANIA.

METHOD OF RECOVERING FROM NITER CAKE PRODUCTS USEFUL IN THE ARTS.

1,255,474.     Specification of Letters Patent.     Patented Feb. 5, 1918.

Application filed February 8, 1917. Serial No. 147,337.

*To all whom it may concern:*

Be it known that I, LAURENCE T. SHERWOOD, a citizen of the United States, and a resident of Connellsville, in the county of Fayette and State of Pennsylvania, have invented certain new and useful Improvements in Methods of Recovering from Niter Cake Products Useful in the Arts, of which the following is a specification.

The principal object of the present invention is to recover from niter cake, essentially $HNaSO_4$, salt cake or normal sulfate of soduim and sulfuric acid in such a way that the recovery can be made in connection with a plant for manufacturing sulfuric acid from sulfur, and this object is accomplished, according to my invention, by a process which will be first described and finally claimed.

Reference may be made to the accompanying drawings in which—

Figure 1:
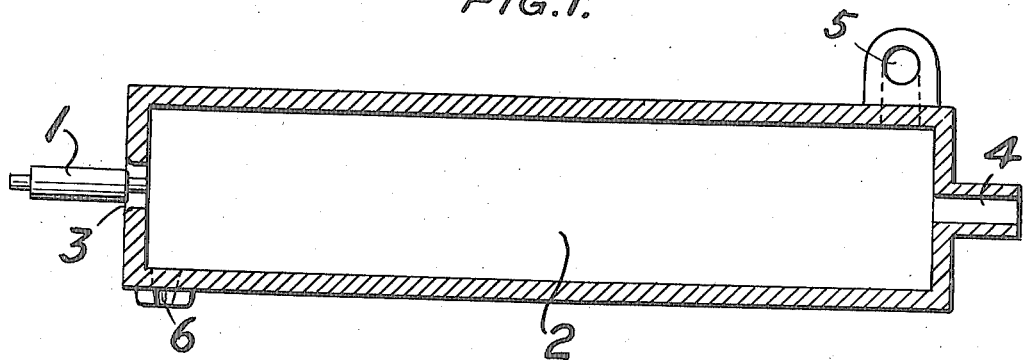
Figure 1, is a top or plan view, partly in section.
Figure 2:
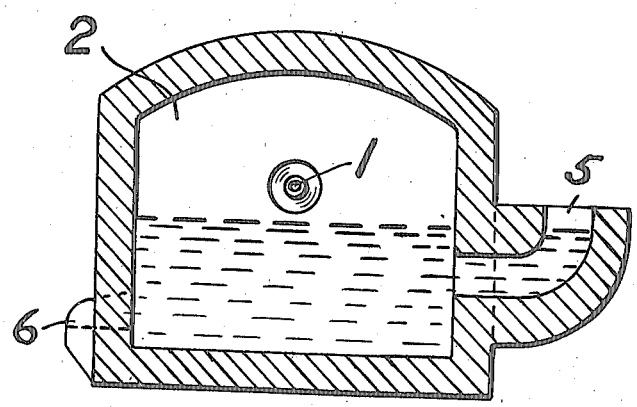
Fig. 2, is a sectional view.

In the practice of the invention sulfur is vaporized in any suitable device such as a rotary sulfur burner 1, which is one of the devices in commercial use. Sulfur vapor together with some sulfur-dioxid from the sulfur burner 1, enters the furnace 2, in which the sulfur vapor is burned to oxids of sulfur by a supply of air entering at 3, through an annular space surrounding the outlet of the sulfur burner. The furnace 2, is connected with any usual and well understood apparatus for making sulfuric acid from sulfur oxids. As shown, niter cake is introduced into the furnace 2, for example at 5, and is fused by the heat of combustion of the sulfur vapor. The effect of this is that the niter cake is decomposed. The residual product in the furnace is essentially sodium-sulfate and can be recovered as at 6.

Gaseous products from the niter cake are water vapor, sulfur-dioxid and sulfur-trioxid. If the niter cake has been previously mixed with carbon or some other substance to assist in the decomposition of the niter cake, the sulfur may be chiefly in the form of sulfur-dioxid. If the niter cake alone has been fused, the sulfur may be chiefly in the form of sulfur-trioxid. The sulfur oxids of combustion and decomposition pass out of the furnace at 4, and are converted into sulfuric acid in a manner that is well understood and need not be explained to those skilled in the art. Some times in the manufacture of sulfuric acid, sulfur oxids are derived from the combustion of pyrites, and the sensible heat of the products of combustion from the pyrites furnace which include sulfur oxids can be utilized for fusing niter cake, and in this case the sulfur oxids of combustion and of decomposition can be used together for making sulfuric acid, so that reference to burning sulfur is intended to include burning pyrites.

By this process the heat of combustion of the sulfur or pyrites is utilized for the decomposition of the niter cake and the decomposition of the niter cake furnishes sulfur-oxids which are used along with the sulfur-oxids of combustion in the manufacture of sulfuric acid; thus an economy of fuel is effected.

What I claim is:

The method of recovering useful products from niter cake which consists in burning sulfur, and applying the heat of combustion to niter cake to decompose it into sulfur oxid and sodium sulfate, converting the sulfur-oxids of combustion and decomposition into sulfuric acid, and recovering the sodium-sulfate, substantially as described.

LAURENCE T. SHERWOOD.